(12) United States Patent
Okayama (10) Patent No.: US 11,012,590 B2
(45) Date of Patent: May 18, 2021

(54) INFORMATION PROCESSING APPARATUS RECORDING JOB EXECUTION HISTORY, INFORMATION PROCESSING METHOD, AND STORAGE MEDIUM

(71) Applicant: CANON KABUSHIKI KAISHA, Tokyo (JP)

(72) Inventor: Noritsugu Okayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/512,025

(22) Filed: Jul. 15, 2019

(65) Prior Publication Data
US 2020/0028989 A1    Jan. 23, 2020

(30) Foreign Application Priority Data

Jul. 20, 2018 (JP) .............................. JP2018-136852

(51) Int. Cl.
*H04N 1/00* (2006.01)
*H04N 1/44* (2006.01)

(52) U.S. Cl.
CPC ............ *H04N 1/44* (2013.01); *H04N 1/0097* (2013.01); *H04N 2201/0094* (2013.01)

(58) Field of Classification Search
CPC ............................... H04N 1/44; H04N 1/0097
See application file for complete search history.

(56) References Cited

U.S. PATENT DOCUMENTS

| 5,278,903 | A | * | 1/1994 | Matsui | ................. H04N 1/4413 358/403 |
| 9,785,973 | B2 | * | 10/2017 | Tollinger | ............ G06F 16/9535 |
| 2005/0240626 | A1 | * | 10/2005 | Ahn | ..................... G06F 16/9566 |
| 2010/0039664 | A1 | * | 2/2010 | Funakawa | ............ G03G 15/502 358/1.15 |
| 2010/0079780 | A1 | | 4/2010 | Lee | |
| 2010/0177344 | A1 | * | 7/2010 | Matsumoto | ........ H04N 1/00344 358/1.15 |
| 2011/0255132 | A1 | | 10/2011 | Shimada | |
| 2012/0099136 | A1 | | 4/2012 | Ueda | |
| 2015/0153988 | A1 | | 6/2015 | Tabuki et al. | |
| 2015/0324161 | A1 | | 11/2015 | Shibuya | |
| 2017/0104892 | A1 | | 4/2017 | Sakagami et al. | |

FOREIGN PATENT DOCUMENTS

| JP | 2004-199409 A | 7/2004 |
| JP | 2007-83682 A | 4/2007 |
| JP | 2015-130645 A | 7/2015 |

\* cited by examiner

*Primary Examiner* — Ibrahim Siddo
(74) *Attorney, Agent, or Firm* — Canon U.S.A., Inc. IP Division (57) ABSTRACT

An information processing apparatus saves log information related to an executed job, and includes a determination unit that determines one of at least a first mode and a second mode as a saving mode for the log information, based on setting by a user, and a saving control unit that saves log information including information about a plurality of items related to an executed job, in a case where the first mode is determined as the saving mode, and saves log information not including information about a predetermined first item and including information about a second item different from the first item, among the plurality of items related to the executed job, in a case where the second mode is determined as the saving mode.

31 Claims, 9 Drawing Sheets

INFORMATION PROCESSING APPARATUS RECORDING JOB EXECUTION HISTORY, INFORMATION PROCESSING METHOD, AND STORAGE MEDIUM

BACKGROUND OF THE INVENTION

Field of the Invention

The present invention relates to an information processing apparatus recording a job execution history, an information processing method, and a storage medium.

Description of the Related Art

Japanese Patent Application Laid-Open No. 2007-83682 discusses an image forming apparatus that records a job execution history. An image forming apparatus that can be set to hide a job history and an image forming apparatus that cannot output a job history to outside from the viewpoint of information security are also known.

SUMMARY OF THE INVENTION

According to an aspect of the present invention, an information processing apparatus saves log information related to an executed job and includes at least one memory device that stores a set of instructions, and at least one processor that executes the set of instructions to determine one of at least a first mode and a second mode as a saving mode for the log information, based on setting by a user, save log information including information about a plurality of items related to an executed job, in a case where the first mode is determined as the saving mode, and save log information not including information about a predetermined first item and including information about a second item different from the first item, among the plurality of items related to the executed job, in a case where the second mode is determined as the saving mode.

Further features of the present invention will become apparent from the following description of exemplary embodiments with reference to the attached drawings.

DESCRIPTION OF THE EMBODIMENTS

Exemplary embodiments of the present invention will be described in detail below with reference to the drawings.

In a first exemplary embodiment, a job history recording method for not retaining a predetermined item among items related to job execution as log information will be described. The predetermined item not to be retained as log information is, for example, information linked to identification of a user. Examples of the predetermined item include a job name, user identification information, a file name, and destination information that are related to an executed job. The first exemplary embodiment will be described below as an exemplary embodiment in which personal information is not retained, i.e., the personal information is used as an example of the predetermined item not to be retained as log information.

Figure 1:
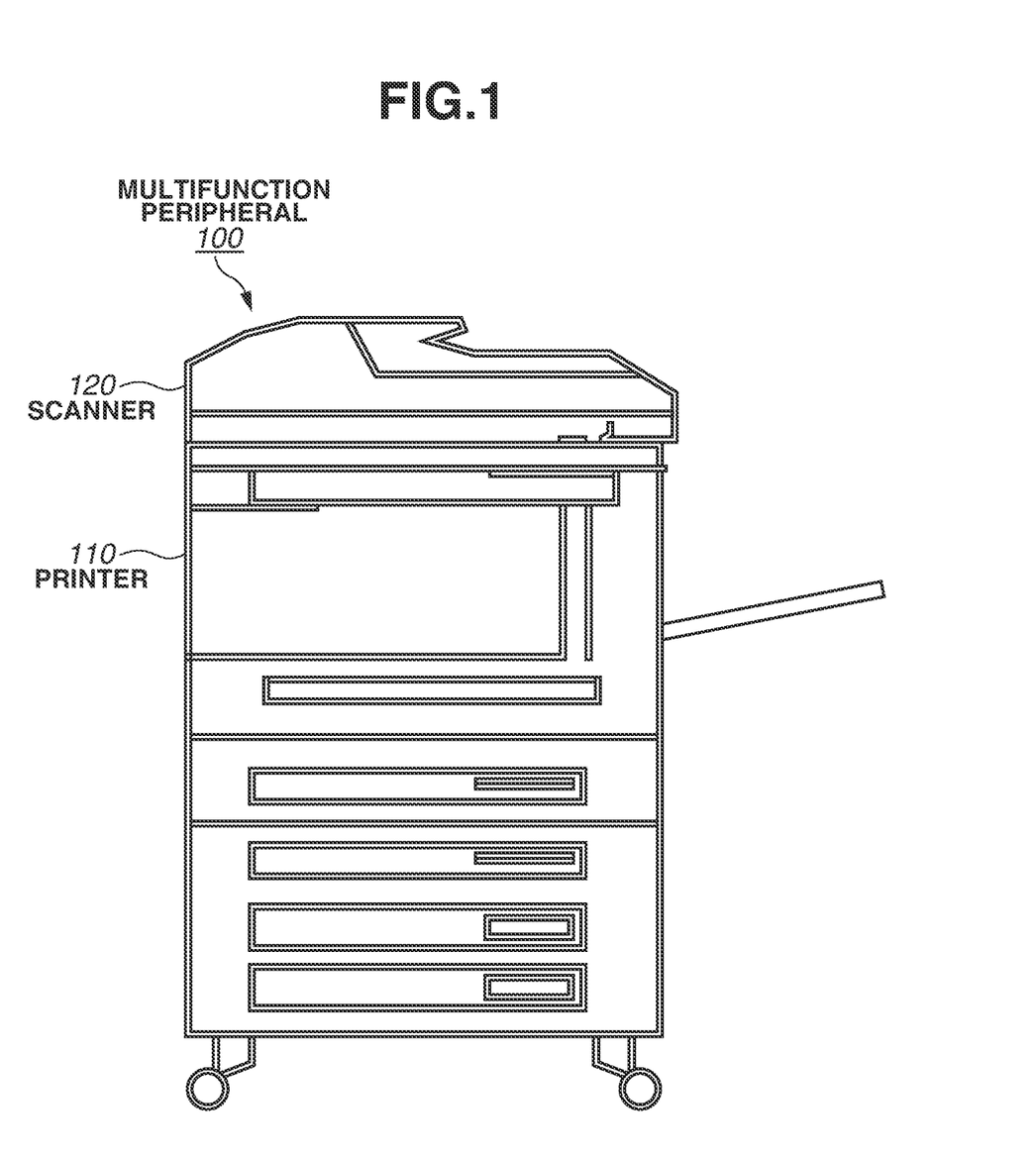
FIG. 1 is a diagram illustrating an example of an appearance of a multifunction peripheral.

FIG. 1 is a diagram illustrating an example of an appearance of a multifunction peripheral 100. Of the multifunction peripheral 100, an upper part includes a scanner 120 and a lower part includes a printer 110. The multifunction peripheral 100 is an example of an image forming apparatus.

Figure 2:
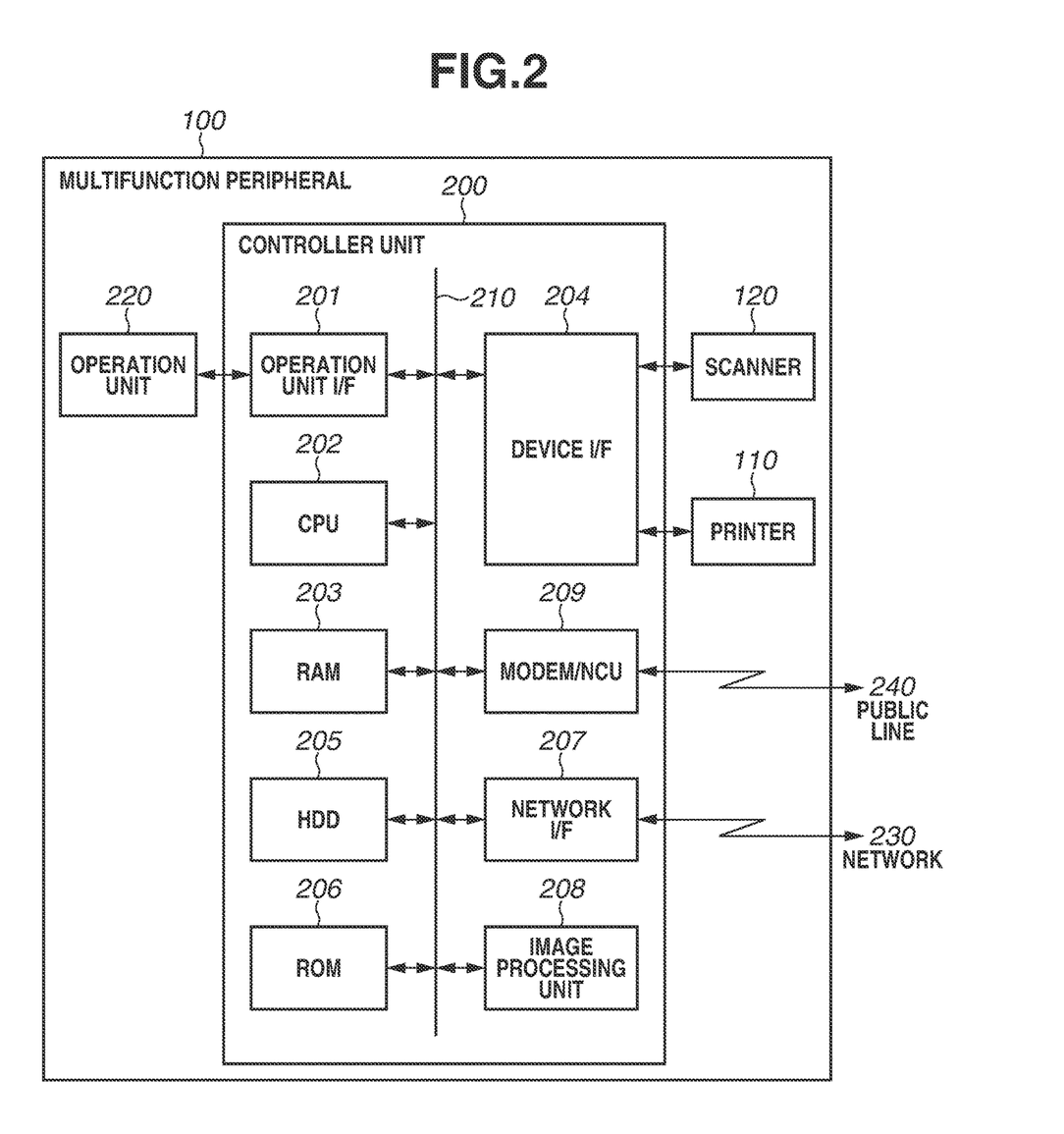
FIG. 2 is a diagram illustrating an example of a hardware configuration of the multifunction peripheral.

FIG. 2 is a diagram illustrating an example of a hardware configuration of the multifunction peripheral 100. The multifunction peripheral 100 includes a controller unit 200, an operation unit 220, the scanner 120, and the printer 110. The operation unit 220, the scanner 120 serving as an image input device, and the printer 110 serving as an image output device are connected to the controller unit 200. The controller unit 200 has a central processing unit (CPU) 202. The CPU 202 starts an operating system (OS), using a boot program stored in a read only memory (ROM) 206. Further, the CPU 202 executes an application program stored in the ROM 206, on this OS. A software configuration of the multifunction peripheral 100 illustrated in FIG. 3 to be described below is thereby implemented, and processing of a flowchart illustrated in each of FIGS. 4 to 9 to be described below is thereby implemented as well. In another example, at least a part of the function or processing of the multifunction peripheral 100 may be implemented by causing, for example, a plurality of CPUs, random access memories (RAMs), ROMs, and hard disk drives (HDDs) to operate together. In another example, at least a part of the function or processing of the multifunction peripheral 100 may be implemented by using a hardware circuit. In another example, the function or processing of the multifunction peripheral 100 may be implemented by causing a plurality of apparatuses to operate together.

A RAM 203 is used as a work area of the CPU 202. Further, the RAM 203 provides, in addition to the work area, a cache area for temporarily storing data. A HDD 205 stores various kinds of log data such as a history of print jobs executed in the multifunction peripheral 100 and a fax communication history. The ROM 206, the RAM 203, an operation unit interface (I/F) 201, a device I/F 204, a network I/F 207, and an image processing unit 208 are connected to the CPU 202, via a system bus 210.

The operation unit I/F 201 is an interface with the operation unit 220 having a touch panel, and outputs image data to be displayed by the operation unit 220 to the operation unit 220. The scanner 120 and the printer 110 are connected to the device I/F 204. The device I/F 204 performs synchronous/asynchronous conversion of image data. The network I/F 207 is connected to a network 230, and inputs and outputs information from and to each device on the network 230 via the network 230. The image processing unit 208 performs processing such as processing for an image input from a scanner, processing for an image to be output to a printer, image rotation, image compression, resolution conversion, color space conversion, and tone conversion. A modulator-demodulator/network control unit (MODEM/NCU) 209 has a function of performing modulation and demodulation of facsimile transmission/reception signals, and transmitting a selection signal (a dial pulse or dial tone) to a public line 240. The MODEM/NCU 209 also performs fax incoming call operation based on detection of a calling signal.

Figure 3:
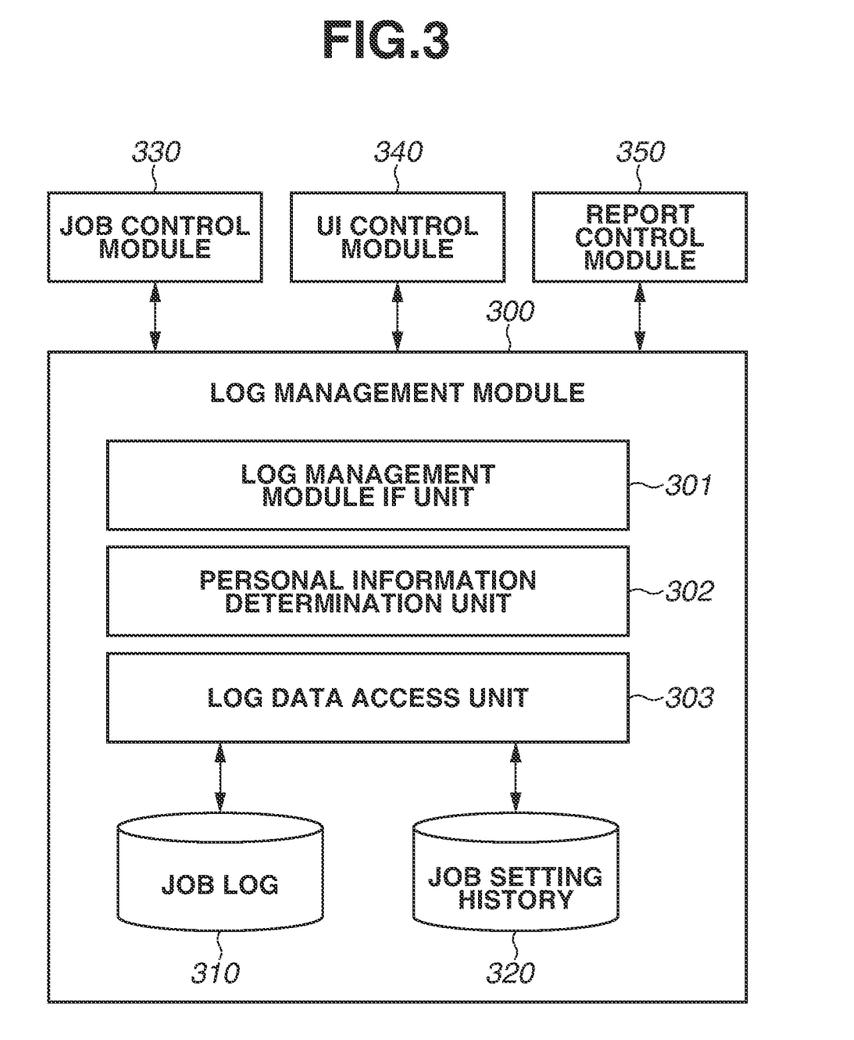
FIG. 3 is a diagram illustrating an example of a software configuration of the multifunction peripheral.

FIG. 3 is a diagram illustrating an example of a software configuration of the multifunction peripheral 100.

A user interface (UI) control module 340 identifies a user by receiving login information about the user, and receives a job for the multifunction peripheral 100. A job control module 330 controls various jobs such as printing, scanning, and fax transmission in the multifunction peripheral 100.

A log management module 300 performs reading or writing for each of a job log 310 and a job setting history 320, based on a request from each of the job control module 330, the UI control module 340, and a report control module 350. The UI control module 340 can read out the job log 310 and display the job log 310 at the operation unit 220, or read out the job setting history 320 and display the job setting history 320 at the operation unit 220, in response to an instruction from the user. The job log 310 and the job setting history 320 are stored in the HDD 205.

A log management module IF unit 301 receives a request for reading or writing for each of the job log 310 and the job setting history 320, from outside the log management module 300.

The log management module IF unit 301 can also receive an event from the job control module 330 when a job ends, and an event from the UI control module 340 when a user logs out.

A personal information determination unit 302 determines which piece of data among a plurality of pieces of data managed in the job log 310 or the job setting history 320 corresponds to personal information. The personal information determination unit 302 thereby determines whether this piece of data is a target piece of data to be recorded in the job log 310 or the job setting history 320.

A log data access unit 303 performs actual read-write (RW) processing for each of the job log 310 and the job setting history 320, and controls data writing based on a result of determination by the personal information determination unit 302.

Figure 4:
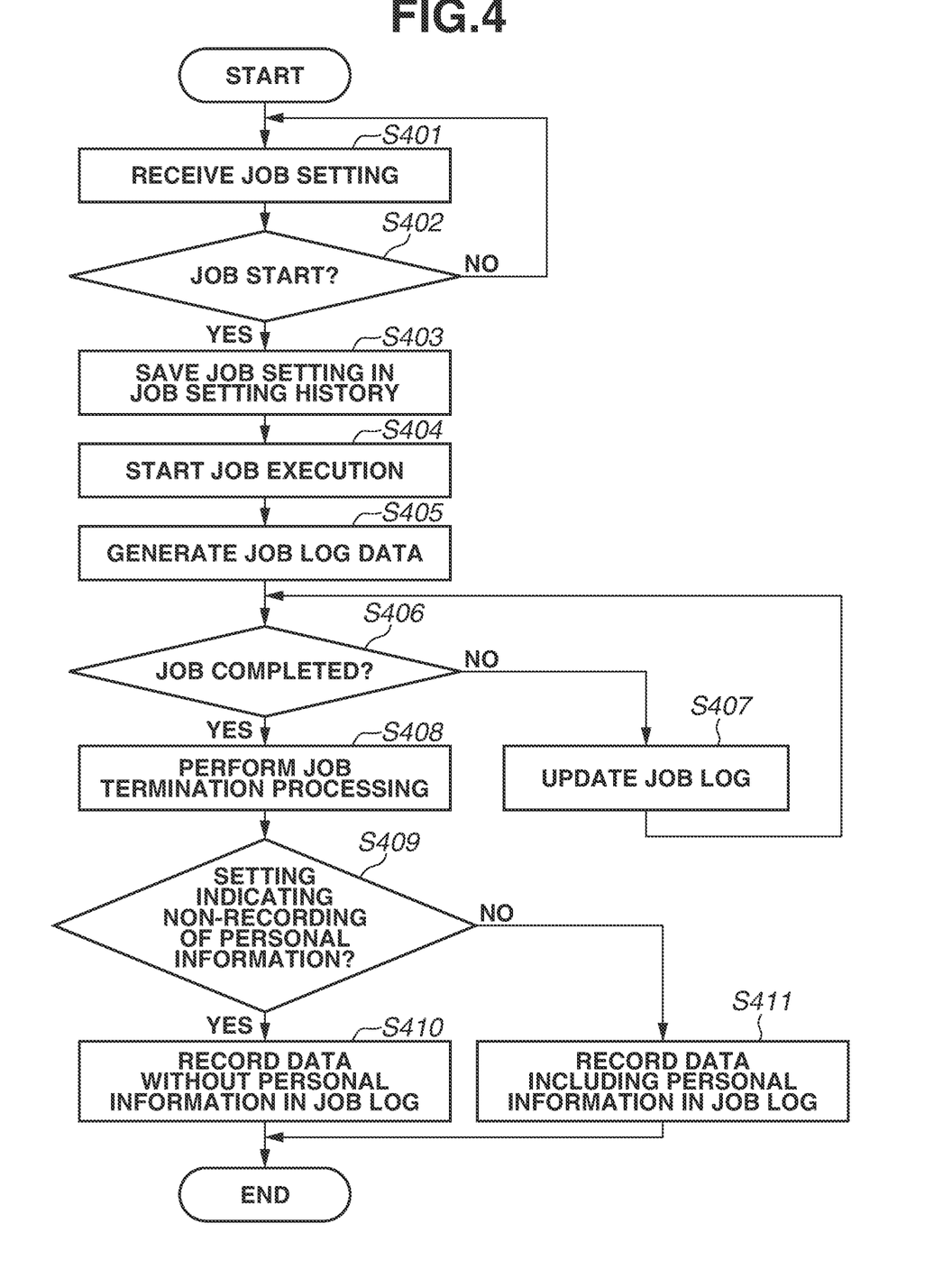
FIG. 4 is a flowchart illustrating an example of basic information processing according to a first exemplary embodiment.

FIG. 4 is a flowchart illustrating an example of information processing for recording each of the job log 310 and the job setting history 320, when a job is executed by the multifunction peripheral 100 according to the first exemplary embodiment.

In step S401, the UI control module 340 receives job setting from the user via the operation unit 220. For example, the UI control module 340 receives setting related to job control to be executed by the multifunction peripheral 100, such as the number of copies for a copy job, and a transmission destination for a fax transmission job, via the operation unit 220. Further, the UI control module 340 may store setting information that indicates setting for not retaining information about a designated item in a job log, into the HDD 205, based on a designation operation performed by the user via the operation unit 220. This processing is an example of first setting processing for not retaining information about a designated item in a job log. The information about the designated item is, for example, personal information. The user can designate an item that the user does not want to retain, among a plurality of items, via a screen.

In step S402, the UI control module 340 determines whether a job start operation is received from the user. If the UI control module 340 determines that a job start operation is received from the user (YES in step S402), the processing proceeds to step S403. If the UI control module 340 determines that a job start operation is not received from the user (NO in step S402), step S401 is repeated.

In step S403, the UI control module 340 saves the job setting received in step S401, in the job setting history 320 managed by the log management module 300.

In step S404, the job control module 330 starts execution of a job.

In step S405, the job control module 330 generates log data of the job of which execution has started, in the job log 310 managed by the log management module 300.

In step S406, the job control module 330 determines whether the job is completed. If the job control module 330 determines that the job is completed (YES in step S406), the processing proceeds to step S408. If the job control module 330 determines that the job is not completed (NO in step S406), the processing proceeds to step S407.

In step S407, the job control module 330 updates the job log 310 managed by the log management module 300, based on a job execution status.

In step S408, the job control module 330 performs job termination processing.

In step S409, the personal information determination unit 302 determines whether the setting indicates non-recording of the personal information in the job log 310, based on the setting information stored in the HDD 205. If the personal information determination unit 302 determines that the setting indicates non-recording of the personal information in the job log 310 (YES in step S409), the processing proceeds to step S410. If the personal information determination unit 302 determines that the setting indicates recording of the personal information in the job log 310 (NO in step S409), the processing proceeds to step S411.

In step S410, the log data access unit 303 prevents writing of data corresponding to the personal information among the log data of the job, in the job log 310. Further, in a case where the personal information is written in the job log 310 in step S405 or S407, the log data access unit 303 deletes the personal information from the job log 310. In this way, the log data not including the data corresponding to the personal information is generated. The processing in step S410 is an example of control processing for deleting information about a designated item from a job log after completion of a job, in a case where setting is made not to retain the information about the designated item in the job log.

In step S411, the log data access unit 303 records the log data of the job, including the data corresponding to the personal information, in the job log 310.

Table 1 indicates a history of print jobs, as an example of the job log 310 in a case where the personal information is recorded in step S411.

TABLE 1

| Job User ID | User Name | File Name | Job Start Time | Job End Time | Operation Result |
|---|---|---|---|---|---|
| 1 | Hiroshima | COPY 1 | 2018 May 21 18:41 | 2018 May 21 18:43 | Success |

TABLE 1-continued

| Job ID | User Name | File Name | Job Start Time | Job End Time | Operation Result |
|---|---|---|---|---|---|
| 2 | Miyazaki | aaa.pdf | 2018 May 21 18:42 | 2018 May 21 18:44 | Success |
| 3 | Yamaguchi | abc.doc | 2018 May 21 18:51 | 2018 May 21 18:55 | Success |
| 4 | Chiba | ccc.txt | 2018 May 21 18:55 | 2018 May 21 18:59 | Failure |

In Table 1, information including user names and file names that are the personal information is recorded in the job log 310.

Table 2 indicates a history of print jobs, as an example of the job log 310 in a case where the personal information is not recorded in step S410.

TABLE 2

| Job ID | User Name | File Name | Job Start Time | Job End Time | Operation Result |
|---|---|---|---|---|---|
| 1 | — | — | 2018 May 21 18:41 | 2018 May 21 18:43 | Success |
| 2 | — | — | 2018 May 21 18:42 | 2018 May 21 18:44 | Success |
| 3 | — | — | 2018 May 21 18:51 | 2018 May 21 18:55 | Success |
| 4 | — | — | 2018 May 21 18:55 | 2018 May 21 18:59 | Failure |

In Table 2, information not including user names and file names that are the personal information is recorded in the job log 310, as a history of print jobs. In this way, in the present exemplary embodiment, in a case where a mode (a second mode) of not recording a predetermined item in the job log 310 is set, log information not including the predetermined item (e.g., the personal information) is generated accompanying the execution of a job and the generated log information is saved. The log information not including the predetermined item may be generated by deleting a part of information (i.e., the information of the predetermined item) after the log information including the predetermined item is stored. In this process, information indicating that the information about the designated item is deleted may be recorded. Alternatively, the log information may be generated not to include the predetermined item, without execution of the deletion processing.

Meanwhile, in the present exemplary embodiment, for example, a job execution start time, a job execution end time, and information indicating success or failure of job execution are recorded as the log information, even if the mode of not recording the predetermined item is effective.

The user name and the file name in the print job are each described as the predetermined item not to be retained as log information, but the predetermined item is not limited to the user name and the file name. The predetermined item can be any item if the item is information linked to identification of a user who has executed a job. For example, the predetermined item is a job name, user identification information, a file name, or destination information related to the executed job.

In Table 2, a state where each of a user name and a file name is not recorded is expressed as "-" for convenience. However, with respect to the way of holding data in the job log 310, any type of format may be used if the format makes it impossible to guess the original information. For example, null data may be used.

Table 3 indicates an example of data of the job log 310 related to the active job in step S405 to step S407.

TABLE 3

| Job ID | User Name | File Name | Job Start Time | Job End Time | Operation Status |
|---|---|---|---|---|---|
| 1 | Hiroshima | COPY 1 | 2018 May 21 18:41 | — | Printing |
| 2 | Hiroshima | aaa.pdf | 2018 May 21 18:42 | — | Waiting |

As for the active job, because the user name and the file name are recorded, the user can easily confirm the status of the active job.

Figure 5:
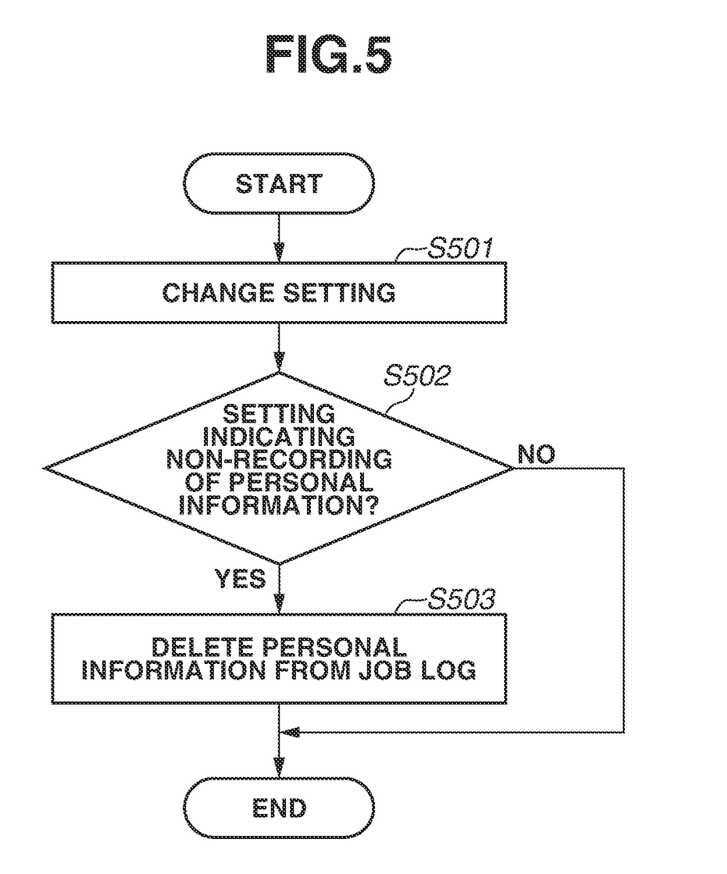
FIG. 5 is a flowchart illustrating an example of setting change processing according to the first exemplary embodiment.

FIG. 5 is a flowchart illustrating an example of processing for changing setting that indicates whether to record the personal information in the job log 310.

In step S501, the UI control module 340 receives a change operation for the setting that indicates whether to record the personal information, from the user via the operation unit 220. Based on the change operation, the UI control module 340 changes the setting information stored in the HDD 205. Here, the initial setting is made to retain information about all the items of a job log. The processing in step S501 is an example of processing for changing setting not to retain information about a designated item in a job log.

In step S502, the log data access unit 303 determines whether the setting indicates non-recording of the personal information in the job log 310, based on the setting information. If the log data access unit 303 determines that the setting indicates non-recording of the personal information in the job log 310 (YES in step S502), the processing proceeds to step S503. If the log data access unit 303 determines that the setting indicates recording of the personal information in the job log 310 (NO in step S502), the processing in the flowchart illustrated in FIG. 5 ends.

In step S503, the log data access unit 303 deletes the data corresponding to the personal information from the data already recorded in the job log 310. The processing in step S503 is an example of control processing for deleting information about a designated item from a job log, in a case where setting is changed not to retain the information about the designated item in the job log. For example, in a case where the data of the job log 310 is in the state illustrated in Table 1, the deletion of the user names and the file names in step S503 results in the state illustrated in Table 2.

In a conventional technology, a job history remains recorded in the main body of an image forming apparatus, and therefore, there is a risk of removable of a hard disk, and a risk of fraudulent acquisition of log information.

Even if there is no fraudulent act, there is a case where information for identifying a user is transmitted to an external apparatus such as an external server as log information despite the intention of the user.

In the above-described exemplary embodiment, log information not including information about a predetermined first item and including information about a second item different from the first item among a plurality of items of an executed job is saved in a case where the above-described second mode is determined as a saving mode for a job log.

The information about the predetermined first item includes at least one of a job name, user identification information, a file name, and destination information that are related to the executed job.

The second item includes at least one of a job execution start time, a job execution end time, and information indicating success or failure of job execution.

According to the above-described exemplary embodiment, information for identifying a user, such as a job name, user identification information, a file name, and destination information, can be prevented from being saved as log information.

Therefore, even in a case where a hard disk is removed or a job history is acquired in a fraudulent way, leakage of the information for identifying the user can be prevented.

Alternatively, the information for identifying the user can be prevented from being transmitted to an external apparatus such as an external server as log information despite the intention of the user, by setting of the second mode by the user.

In a second exemplary embodiment, a method for recording a history in a case where job setting for not retaining information about a predetermined item related to job execution is made will be described.

In the present exemplary embodiment, personal information will be described as an example of the predetermined item not to be retained as log information, but the predetermined item is not limited to this example. As with the first exemplary embodiment, the predetermined item not to be retained as log information is, for example, information linked to identification of a user. Examples of the predetermined item include a job name, user identification information, a file name, and destination information that are related to an executed job.

Figure 6:
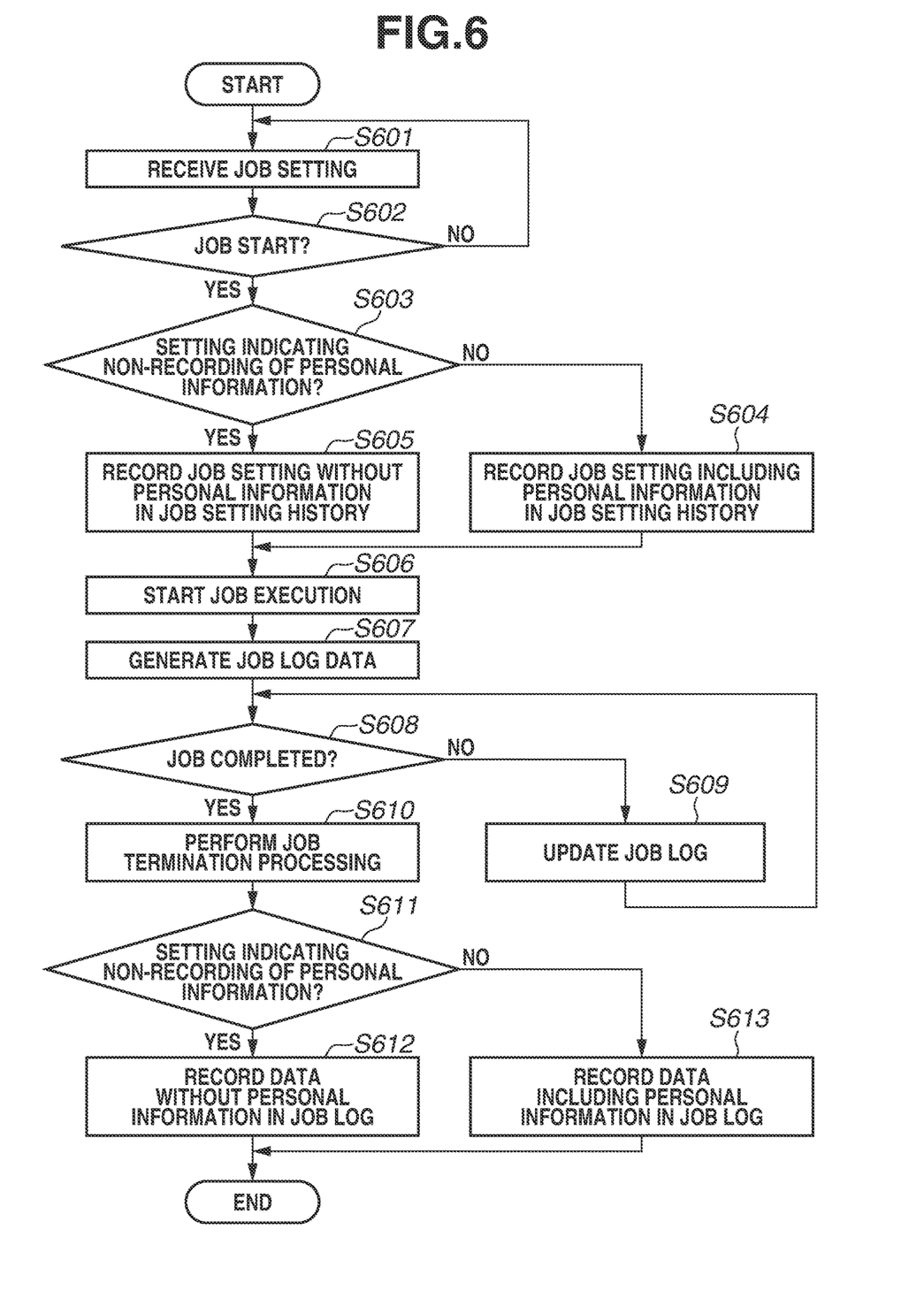
FIG. 6 is a flowchart illustrating an example of basic information processing according to a second exemplary embodiment.

As for FIGS. 1, 2, and 3, the second exemplary embodiment is similar to the first exemplary embodiment, and therefore description with reference to these drawings will be omitted. FIG. 6 is a flowchart illustrating an example of information processing for recording in a job log 310 and a job setting history 320, during job execution by a multifunction peripheral 100 according to the second exemplary embodiment.

In step S601, a UI control module 340 receives job setting from a user via an operation unit 220. For example, the UI control module 340 receives setting related to job control to be executed by the multifunction peripheral 100, such as the number of copies for a copy job, and a transmission destination for a fax transmission job, via the operation unit 220. Further, the UI control module 340 may store setting information that indicates setting for not retaining information about a designated item in a job log, into a HDD 205, based on a designation operation performed by the user via the operation unit 220. Furthermore, the UI control module 340 may include setting for not retaining information about an item designated by the user in setting information stored in the HDD 205, based on a designation operation performed by the user via the operation unit 220. This processing is an example of second setting processing for not retaining information about an item designated by a user.

In receiving the job setting in step S601, the UI control module 340 can call up the past data of the job setting history 320. The UI control module 340 thereby supports an operation in a case where the user wants to execute a job based on setting similar to setting for a job executed by the user in the past.

Table 4 indicates an example of the job setting history 320.

TABLE 4

| Job ID | Job Type | Job Setting |
|---|---|---|
| 1 | Copy | Scan mode: Two-sided scan, Print mode: Two-sided print, Monochrome/color: Color mode, Density: 7 |
| 2 | Fax | Destination: 0297889012, Density: Auto, Document size: A4, Resolution: 200 dpi |
| 3 | Print | File name: abc.doc, Monochrome/color: Color mode, Feeder: Cassette 1 |

For example, when the user performs copy, the UI control module 340 calls up data corresponding to a job type of copy from the job setting history 320, and displays the called-up data at the operation unit 220. The user can thereby avoid setting "Scan mode: Two-sided scan, Print mode: Two-sided print, Monochrome/color: Color mode, Density: 7" repeatedly.

In step S602, the UI control module 340 determines whether a job start operation is received from the user. If the UI control module 340 determines that a job start operation is received from the user (YES in step S602), the processing proceeds to step S603. If the UI control module 340 determines that a job start operation is not received from the user (NO in step S602), step S601 is repeated.

In step S603, a personal information determination unit 302 determines whether the setting indicates non-recording of personal information in the job setting history 320, based on the setting information stored in the HDD 205. The UI control module 340 has stored into the HDD 205 setting information that indicates whether to record the personal information in the job setting history 320, based on a setting operation performed by the user via the operation unit 220. If the personal information determination unit 302 determines that the setting indicates non-recording of the personal information in the job setting history 320 (YES in step S603), the processing proceeds to step S605. If the personal information determination unit 302 determines that the setting indicates recording of the personal information in the job setting history 320 (NO in step S603), the processing proceeds to step S604.

In step S604, a log data access unit 303 records information about the job setting including data corresponding to the personal information, in the job setting history 320.

Table 4 indicates an example of data of the job setting history 320 in a case where the personal information is to be recorded. The personal information, such as a destination for a job type of fax and a file name for a job type of print, is recorded in Table 4.

In step S605, the log data access unit 303 records information obtained by deleting the data corresponding to the personal information from the information about the job setting, in the job setting history 320. The processing in step S605 is an example of control processing for recording information obtained by deleting information about a designated item from job setting in a job setting history, in a case where setting is made not to retain the information about the designated item in the job setting history.

Table 5 indicates an example of data of the job setting history 320 in a case where the personal information is not to be recorded.

TABLE 5

| Job ID | Job Type | Job Setting |
|---|---|---|
| 1 | Copy | Scan mode: Two-sided scan, Print mode: Two-sided print, Monochrome/color: Color mode, Density: 7 |

TABLE 5-continued

| ID | Job Type | Job Setting |
|----|----------|-------------|
| 2 | Fax | Destination: —, Density: Auto, Document size: A4, Resolution: 200 dpi |
| 3 | Print | File name: —, Monochrome/color: Color mode, Feeder: Cassette 1 |

The data recorded here is data obtained by deleting the destination for the job type of fax and the file name for the job type of print, as information corresponding to the personal information.

In the present exemplary embodiment, the destination for the job type of fax and the file name for the job type of print are each described as an example of the personal information. However, the personal information is not limited to these examples, and can be any kind of information if the information is linked to identification of a user.

The processing in and after step S606 is similar to the processing in and after step S404 of the flowchart in FIG. 4 in the first exemplary embodiment and therefore will not be described.

Figure 7:
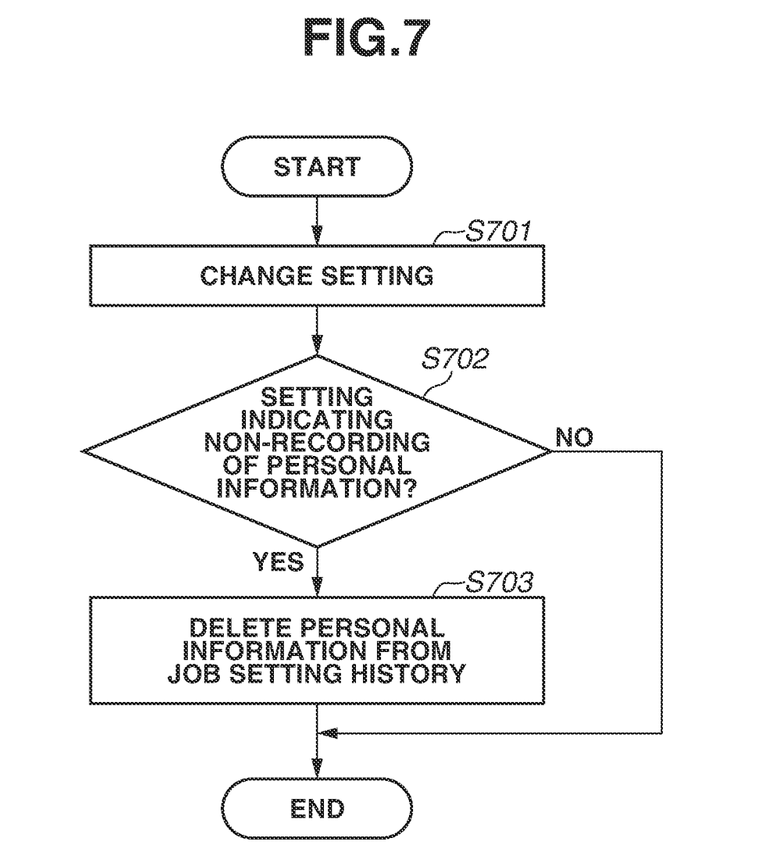
FIG. 7 is a flowchart illustrating an example of setting change processing according to the second exemplary embodiment.

FIG. 7 is a flowchart illustrating an example of processing for changing setting that indicates whether to record the personal information in the job setting history 320.

In step S701, the UI control module 340 receives a change operation for the setting that indicates whether to record the personal information in the job setting history 320, from the user via the operation unit 220. Based on the change operation, the UI control module 340 changes the setting information. Here, the initial setting is made to retain information about all the items of the job setting history 320. The processing in step S701 is an example of processing for changing setting not to retain information about a designated item in a job setting history.

In step S702, the log data access unit 303 determines whether the setting indicates non-recording of the personal information in the job setting history 320, based on the setting information. If the log data access unit 303 determines that the setting indicates non-recording of the personal information in the job setting history 320 (YES in step S702), the processing proceeds to step S703. If the log data access unit 303 determines that the setting indicates recording of the personal information in the job setting history 320 (NO in step S702), the processing in the flowchart illustrated in FIG. 7 ends.

In step S703, the log data access unit 303 deletes the data corresponding to the personal information from the data already recorded in the job setting history 320. The processing in step S703 is an example of control processing for deleting information about a designated item from a job setting history, in a case where setting is changed not to retain the information about the designated item in the job setting history. For example, in a case where the data of the job setting history 320 is the state illustrated in Table 4, the deletion of the destination and the file name in step S703 results in the state illustrated in Table 5.

According to the present exemplary embodiment, after setting (a first mode) for retaining a predetermined item is switched to setting (a second mode) for not retaining the predetermined item, information about the predetermined item recorded during the first setting is deleted. In this way, after the second setting is made, the information about the predetermined item recorded before the second setting can also be prevented from being held.

Leakage of information for identifying a user can be thereby prevented. Alternatively, the information for identifying the user can be prevented from being transmitted to an external apparatus such as an external server as log information despite the intention of the user, by setting of the second mode by the user.

In a third exemplary embodiment, a method for not retaining personal information in a job history by deleting the personal information at the time of logout will be described.

In the present exemplary embodiment, personal information will be described as an example of a predetermined item not to be retained as log information, but the predetermined item is not limited to this example. As with the first exemplary embodiment, the predetermined item not to be retained as log information is, for example, information linked to identification of a user. Examples of the predetermined item include a job name, user identification information, a file name, and destination information that are related to an executed job.

As for FIGS. 1, 2, and 3, the third exemplary embodiment is similar to the first exemplary embodiment, and therefore description with reference to these drawings will be omitted. In the third exemplary embodiment, a user of a multifunction peripheral 100 is managed, and the user logs in beforehand to execute a job.

Figure 8:
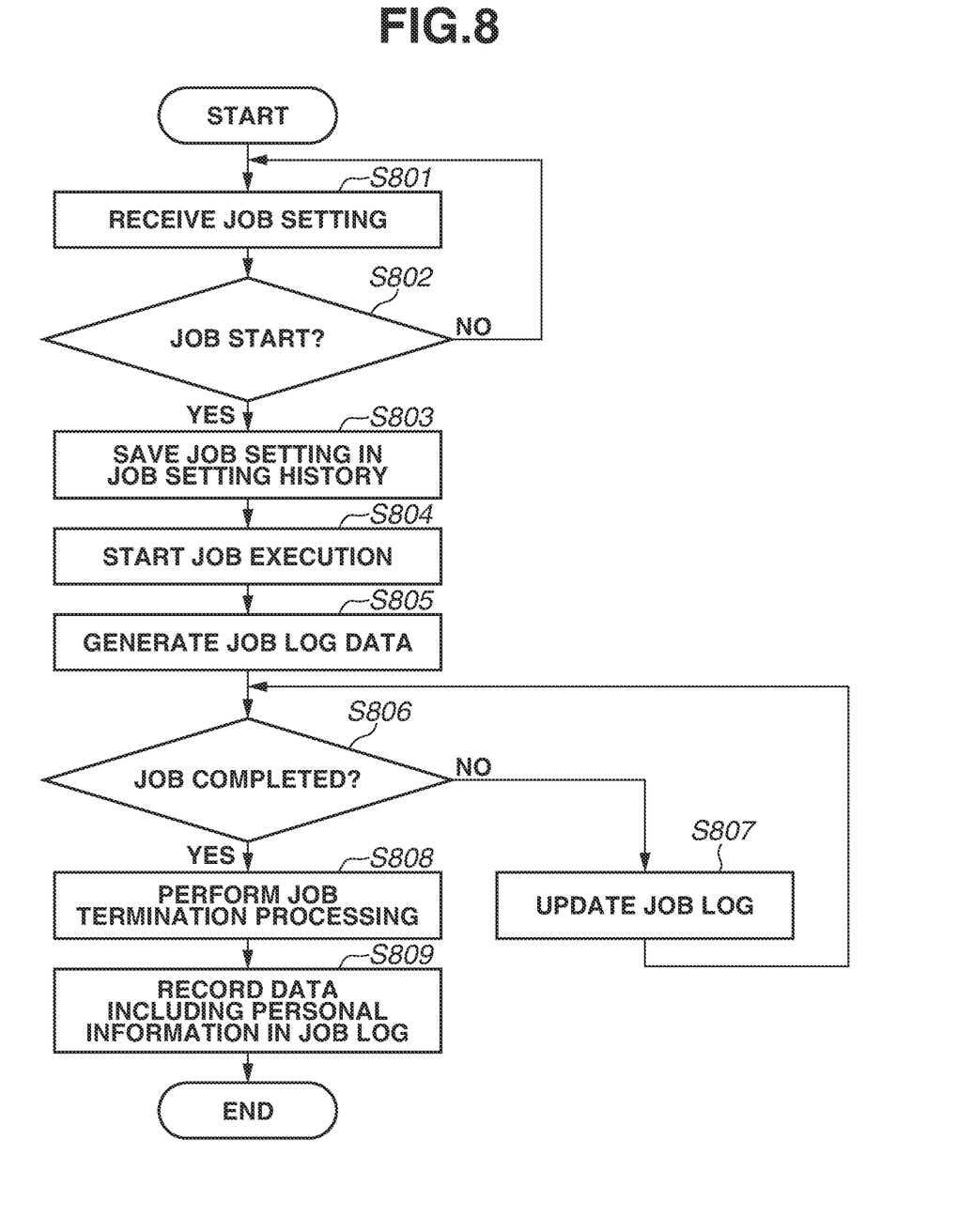
FIG. 8 is a flowchart illustrating an example of basic information processing according to a third exemplary embodiment.

FIG. 8 is a flowchart illustrating an example of information processing for recording in a job log 310 and a job setting history 320, during job execution by the multifunction peripheral 100 according to the third exemplary embodiment.

In step S801, a UI control module 340 receives job setting from a user via an operation unit 220. For example, the UI control module 340 receives setting related to job control to be executed by the multifunction peripheral 100, such as the number of copies for a copy job, and a transmission destination for a fax transmission job, via the operation unit 220. Further, the UI control module 340 may store setting information that indicates setting for not retaining information about a designated item in a job log, into the HDD 205, based on a designation operation performed by the user via the operation unit 220. This processing is an example of the first setting processing for not retaining information about a designated item in a job log.

In step S802, the UI control module 340 determines whether a job start operation is received from the user. If the UI control module 340 determines that a job start operation is received from the user (YES in step S802), the processing proceeds to step S803. If the UI control module 340 determines that a job start operation is not received from the user (NO in step S802), step S801 is repeated.

In step S803, the UI control module 340 saves the job setting received in step S801, in the job setting history 320 managed by a log management module 300.

In step S804, a job control module 330 starts execution of a job.

In step S805, the job control module 330 generates log data of the job of which execution has started, in the job log 310 managed by the log management module 300.

In step S806, the job control module 330 determines whether the job is completed. If the job control module 330 determines that the job is completed (YES in step S806), the processing proceeds to step S808. If the job control module 330 determines that the job is not completed (NO in step S806), the processing proceeds to step S807.

In step S807, the job control module 330 updates the job log 310 managed by the log management module 300, based on a job execution status.

In step S808, the job control module 330 performs job termination processing.

In step S809, a log data access unit 303 records the log data of the job, including data corresponding to the personal information, in the job log 310.

Figure 9:
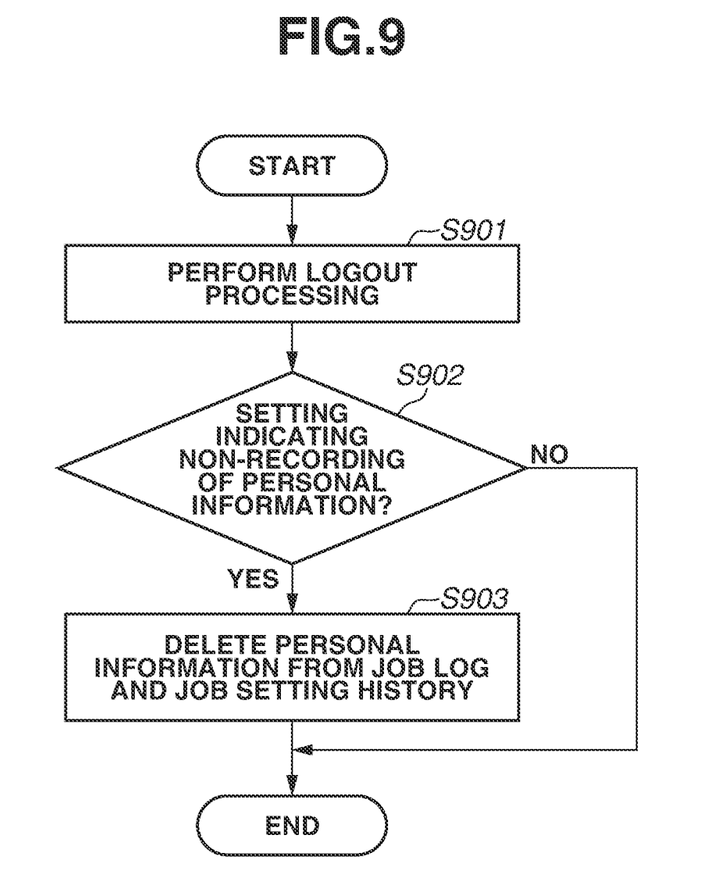
FIG. 9 is a flowchart illustrating an example of logout processing.

FIG. 9 is a flowchart illustrating an example of information processing at the time of the logout.

In step S901, the UI control module 340 performs logout processing, upon receiving a logout operation from the user via the operation unit 220.

In step S902, a personal information determination unit 302 determines whether the setting indicates non-recording of the personal information for the job log 310 and the job setting history 320. The setting that indicates whether to record the personal information can be registered by the user as with the first exemplary embodiment and the second exemplary embodiment, and the setting information is stored in the HDD 205. If the personal information determination unit 302 determines that the setting indicates non-recording of the personal information for the job log 310 and the job setting history 320 (YES in step S902), the processing proceeds to step S903. If the personal information determination unit 302 determines that the setting indicates recording of the personal information for the job log 310 and the job setting history 320 (NO in step S902), the processing in the flowchart illustrated in FIG. 9 ends.

In step S903, the log data access unit 303 deletes the data corresponding to the personal information from the job log 310 and the job setting history 320. The processing in step S903 is an example of control processing for deleting information about a designated item from a job log after completion of a job, in a case where setting is made not to retain the information about the designated item in the job log. In this process, information indicating that the information about the designated item is deleted may be recorded.

Table 6 indicates an example of the data of the job log 310 before the personal information deletion in step S903, and Table 7 indicates an example of the data of the job log 310 after the personal information deletion in step S903.

TABLE 6

| Job ID | User Name | Destination | Transmission File Name | Job Start Time | Job End Time | Operation Result |
|---|---|---|---|---|---|---|
| 1 | Hiroshima | 03456798091 | FAX1 | 2018/5/21 18:41 | 2018/5/21 18:43 | Success |
| 2 | Hiroshima | hiroshima@mail.com | 20180521_1.pdf | 2018/5/21 18:51 | 2018/5/21 18:55 | Failure |

TABLE 7

| Job ID | User Name | Destination | Transmission File Name | Job Start Time | Job End Time | Operation Result |
|---|---|---|---|---|---|---|
| 1 | — | — | — | 2018/5/21 18:41 | 2018/5/21 18:43 | Success |
| 2 | — | — | — | 2018/5/21 18:51 | 2018/5/21 18:55 | Failure |

In the data in Table 6, a user name, a destination, and a transmission file name for each job are recorded, and therefore, the user can easily confirm a history of jobs executed by the user, during login. In the data in Table 7, the information corresponding to the personal information including the user name, the destination, and the transmission file name for each job is deleted from a history of communication jobs executed by a user having a user name "Hiroshima", as compared with the data in Table 6.

In the present exemplary embodiment, the user name, the destination, and the file name are each described an example of the personal information. However, the personal information is not limited to these examples and can be any kind of information if the information is linked to identification of a user.

Moreover, in step S902, the setting for deleting the personal information for each of the job log 310 and the job setting history 320 may be common, or may be independent for each of the job log 310 and the job setting history 320.

According to the present exemplary embodiment, even in a case where a mode of not retaining a predetermined item as log information is determined, log information including the predetermined item is held for a job, until a user who has executed the job logs out. Subsequently, when the user logs out, information about the predetermined item in the log information is deleted. The user can thereby confirm a job execution history of the user in a state where the predetermined item is included, during the login of the user, so that the convenience of the user improves. Moreover, because the predetermined item is deleted after the user logs out, leakage of information for identifying the user can be prevented. Alternatively, the information for identifying the user can be prevented from being transmitted to an external apparatus such as an external server as log information despite the intention of the user.

Other Exemplary Embodiments

The present invention can also be implemented by supplying a program that implements one or more functions of the above-described exemplary embodiments to a system or apparatus via a network or storage medium, and causing one or more processors in a computer of the system or apparatus to execute processing by reading out the program. The present invention can also be implemented by a circuit (e.g., an application-specific integrated circuit (ASIC)) for implementing one or more functions.

The exemplary embodiments of the present invention have been each described above as an example, but the present invention is not limited to such specific exemplary embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-136852, filed Jul. 20, 2018, which is hereby incorporated by reference herein in its entirety.

What is claimed is:

1. An information processing apparatus that saves log information related to comprising:
   at least one memory device that stores a set of instructions; and
   at least one processor that executes the set of instructions to:
   determine one of at least a first mode and a second mode as a saving mode for the log information, based on setting by a user;
   save log information including information about a plurality of items related to the job, in a case where the first mode is determined as the saving mode, the information including user identification information of a user who has instructed execution of the job and a predetermined setting of the job; and
   save log information not including information about the user identification information and including information about the predetermined setting, among information about the plurality of items related to the job, in a case where the second mode is determined as the saving mode.

2. The information processing apparatus according to claim 1, wherein the name, user identification information is a name of the user.

3. The information processing apparatus according to claim 1, wherein the job is a copy job.

4. The information processing apparatus according to claim 1, wherein the job is a fax job.

5. The information processing apparatus according to claim 1, wherein the at least one processor executes the set of instructions to:
   generate log information including the user identification information and the predetermined setting, and then delete the predetermined setting from the log information in a case where the second mode is determined as the saving mode.

6. The information processing apparatus according to claim 1, wherein the at least one processor executes the set of instructions to:
   hold log information including the user identification information until the user has instructed execution of the job, in a case where the second mode is determined as the saving mode; and
   delete the user identification information of the log information, in a case where the user logs out.

7. The information processing apparatus according to claim 1, wherein the at least one processor executes the set of instructions to:
   delete the user identification information of the log information saved before switching of the saving mode from the first mode to the second mode, in a case where the switching occurs.

8. The information processing apparatus according to claim 1, wherein the information processing apparatus is a multifunctional apparatus.

9. The information processing apparatus according to claim 1, wherein the information processing apparatus is a scanning apparatus.

10. The information processing apparatus according to claim 1, wherein the information processing apparatus is a printing apparatus.

11. The information processing apparatus according to claim 1, wherein the job is a print job.

12. The information processing apparatus according to claim 11, wherein the information processing apparatus executes the print job.

13. The information processing apparatus according to claim 3, wherein the information processing apparatus executes the copy job.

14. The information processing apparatus according to claim 4, wherein the information processing apparatus executes the fax job.

15. An information processing method of saving log information related to comprising:
    determining one of at least a first mode and a second mode as a saving mode for the log information, based on setting by a user;
    saving log information including information about a plurality of items related to the job, in a case where the first mode is determined as the saving mode, the information including user identification information of a user who has instructed execution of the job and a predetermined setting of the job; and
    saving log information not including information about the user identification information and including information about the predetermined setting, among information about the plurality of items related to the job, in a case where the second mode is determined as the saving mode.

16. The information processing method according to claim 15, further comprising:
    deleting the file name of the log information saved before switching of the saving mode from the first mode to the second mode, in a case where the switching occurs.

17. The information processing method according to claim 15, further comprising:
    generating log information including the user identification information and the predetermined setting, and then deleting the predetermined setting from the log information in a case where the second mode is determined as the saving mode.

18. The information processing method according to claim 15, further comprising:
deleting the user identification information of the log information saved before switching of the saving mode from the first mode to the second mode, in a case where the switching occurs.

19. A non-transitory computer-readable storage medium storing a program for causing a processor to execute an information processing method for an information processing apparatus that saves log information related to job, the information processing method comprising:
determining one of at least a first mode and a second mode as a saving mode for the log information, based on setting by a user;
saving log information including information about a plurality of items related to the job, in a case where the first mode is determined as the saving mode, the information including user identification information of a user who has instructed execution of the job and a predetermined setting of the job; and
saving log information not including information about the user identification information and including information about the predetermined setting, among information about the plurality of items related to the job, in a case where the second mode is determined as the saving mode.

20. The non-transitory computer-readable storage medium according to claim 19, further comprising:
deleting the file name of the log information saved before switching of the saving mode from the first mode to the second mode, in a case where the switching occurs.

21. The non-transitory computer-readable storage medium according to claim 19, further comprising:
generating log information including the user identification information and the predetermined setting, and then deleting the predetermined setting from the log information in a case where the second mode is determined as the saving mode.

22. The non-transitory computer-readable storage medium according to claim 19, further comprising:
deleting the user identification information of the log information saved before switching of the saving mode from the first mode to the second mode, in a case where the switching occurs.

23. An information processing apparatus that saves log information related to a job, comprising:
at least one memory device that stores a set of instructions; and
at least one processor that executes the set of instructions to:
determine one of at least a first mode and a second mode as a saving mode for the log information, based on setting by a user;
save log information including information about a plurality of items related to a job, in a case where the first mode is determined as the saving mode, the information about the plurality of items including a file name which is processed by the job and a predetermined setting of the job; and
save log information not including the file name and including the predetermined setting, among information about the plurality of items related to the job, in a case where the second mode is determined as the saving mode.

24. The information processing apparatus according to claim 23, wherein the job is a print job.

25. The information processing apparatus according to claim 23, wherein the at least one processor executes the set of instructions to:
generate log information including the file name and the predetermined setting, and then delete the predetermined setting from the log information in a case where the second mode is determined as the saving mode.

26. The information processing apparatus according to claim 23, wherein the at least one processor executes the set of instructions to:
hold log information including the file name, in a case where the second mode is determined as the saving mode; and
delete the file name of the log information, in a case where the user logs out.

27. The information processing apparatus according to claim 23, wherein the at least one processor executes the set of instructions to:
delete the file name of the log information saved before switching of the saving mode from the first mode to the second mode, in a case where the switching occurs.

28. The information processing apparatus according to claim 23, wherein the information processing apparatus is a multifunctional apparatus.

29. The information processing apparatus according to claim 23, wherein the information processing apparatus is a scanning apparatus.

30. The information processing apparatus according to claim 23, wherein the information processing apparatus is a printing apparatus.

31. The information processing apparatus according to claim 24, wherein the information processing apparatus executes the print job.

* * * * *